US008263250B2

United States Patent
Hermann

(10) Patent No.: US 8,263,250 B2
(45) Date of Patent: Sep. 11, 2012

(54) LIQUID COOLING MANIFOLD WITH MULTI-FUNCTION THERMAL INTERFACE

(75) Inventor: Weston Arthur Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 496 days.

(21) Appl. No.: 12/655,995

(22) Filed: Jan. 12, 2010

(65) Prior Publication Data

US 2010/0104938 A1  Apr. 29, 2010

Related U.S. Application Data

(63) Continuation-in-part of application No. 11/820,008, filed on Jun. 18, 2007.

(51) Int. Cl.
*H01M 10/50* (2006.01)
*H01M 2/18* (2006.01)
*H01M 2/14* (2006.01)
*H01M 2/16* (2006.01)
*H01M 2/00* (2006.01)

(52) U.S. Cl. ........ 429/120; 429/130; 429/142; 429/129; 429/148

(58) Field of Classification Search .................. 429/120, 429/130, 142, 129, 148
See application file for complete search history.

(56) References Cited

U.S. PATENT DOCUMENTS

| 4,574,112 | A | 3/1986 | Breault et al. |
| 4,678,632 | A | 7/1987 | Ferrari |
| 4,945,010 | A | 7/1990 | Kaufman et al. |
| 7,291,420 | B2 | 11/2007 | Bitsche et al. |
| 2005/0048353 | A1 | 3/2005 | Lisi et al. |
| 2007/0037023 | A1 | 2/2007 | Dunn et al. |

FOREIGN PATENT DOCUMENTS

JP  2002-373708  12/2002

*Primary Examiner* — Helen O Conley
(74) *Attorney, Agent, or Firm* — Patent Law Office of David G. Beck

(57) ABSTRACT

A liquid cooling manifold assembly for use in the thermal management system of a battery pack is provided. The liquid cooling manifold assembly includes a coolant channel portion through which the coolant channels run, and a dual layer thermal interface interposed between the coolant channel portion and the cells of the battery pack. The outer material layer of the dual layer thermal interface is comprised of an electrically non-conductive, high dielectric material that is preferably tear resistant, deformable and has a high tensile strength and a relatively low surface friction. The inner material layer of the dual layer thermal interface is comprised of a highly compressible material.

20 Claims, 3 Drawing Sheets

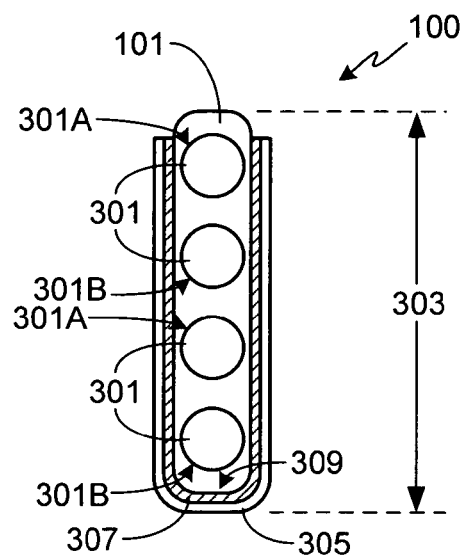
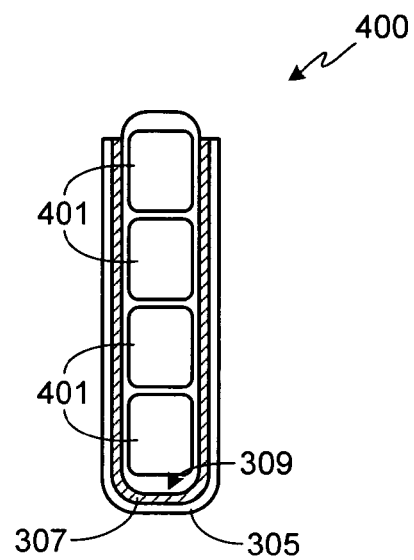
FIG. 3
FIG. 4
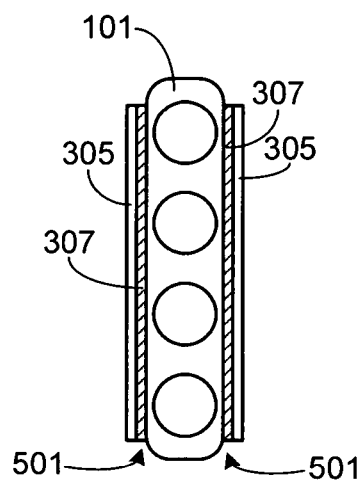
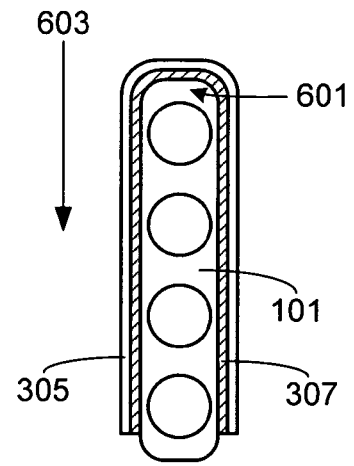
FIG. 5
FIG. 6

LIQUID COOLING MANIFOLD WITH MULTI-FUNCTION THERMAL INTERFACE

CROSS-REFERENCES TO RELATED APPLICATIONS

This application is a continuation-in-part of U.S. patent application Ser. No. 11/820,008, filed Jun. 18, 2007, the disclosure of which is incorporated herein by reference for any and all purposes.

FIELD OF THE INVENTION

The present invention relates generally to battery cooling systems and, more particularly, to a means for improving the manufacturability and performance of a battery cooling system.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries offer a number of advantages over disposable batteries, this type of battery is not without its drawbacks. In general, most of the disadvantages associated with rechargeable batteries are due to the battery chemistries employed, as these chemistries tend to be less stable than those used in primary cells. Due to these relatively unstable chemistries, secondary cells often require special handling during fabrication. Additionally, secondary cells such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

Thermal runaway is of major concern since a single incident can lead to significant property damage. When a battery undergoes thermal runaway, it typically emits a large quantity of smoke, jets of flaming liquid electrolyte, and sufficient heat to lead to the combustion and destruction of materials in close proximity to the cell. If the cell undergoing thermal runaway is surrounded by one or more additional cells as is typical in a battery pack, then a single thermal runaway event can quickly lead to the thermal runaway of multiple cells which, in turn, can lead to much more extensive collateral damage. Regardless of whether a single cell or multiple cells are undergoing this phenomenon, if the initial fire is not extinguished immediately, subsequent fires may be caused that dramatically expand the degree of property damage. For example, the thermal runaway of one or more batteries within the battery pack of a hybrid or electric vehicle may destroy not only the car, but may lead to a car wreck if the car is being driven or the destruction of its surroundings if the car is parked.

There are a number of approaches that may be taken to reduce the risk of thermal runaway. For example, to prevent batteries from being shorted out during storage and/or handling, precautions can be taken such as insulating the battery terminals and using specifically designed battery storage containers. Another approach is to develop new cell chemistries and/or modify existing cell chemistries. For example, research is currently underway to develop composite cathodes that are more tolerant of high charging potentials. Research is also underway to develop electrolyte additives that form more stable passivation layers on the electrodes.

Active battery cooling is another approach that is typically used to reduce thermal runaway risk as well as optimize battery performance and lifetime. Some active battery cooling systems blow air across the batteries themselves, or across a radiator that is thermally coupled to the batteries. Alternately, a battery cooling system may use cooling tubes and a liquid coolant to withdraw heat from the batteries. When the cooling system uses cooling tubes, care must be taken to ensure that the coolant tubes do not short or otherwise electrically interfere with the batteries. Accordingly, a typical coolant tube is either manufactured from an electrically insulating material (e.g., polypropylene), or manufactured from a metal that is coated with an electrically insulating material. Regardless of the material used to fabricate the cooling tube, a thermally conductive material is often positioned between the cooling tube and the batteries in order to improve heat removal efficiency. Unfortunately, due to the material limitations of such thermally conductive materials as well as the minimal spacing between the batteries and the cooling tube, insertion of the thermally conductive interface material is a very labor-intensive process, thus dramatically affecting battery pack cost and manufacturability.

Accordingly, what is needed is a means for improving the manufacturability of a battery pack that uses a battery cooling system, and in particular, for improving the cost, mass, performance and ease of production for such a battery pack. The present invention provides such a means.

SUMMARY OF THE INVENTION

The present invention provides a liquid cooling manifold assembly for use in the thermal management system of a battery pack. The liquid cooling manifold assembly includes a coolant channel portion through which the coolant channels run, and a dual layer thermal interface interposed between the coolant channel portion of the assembly and the cells of the battery pack. The coolant channel portion of the assembly is contoured, specifically with a first plurality of contours coinciding with the cells in a first row of cells, and with a second plurality of contours coinciding with the cells in a second row of cells, where the manifold assembly is interposed between the first and second cell rows. Preferably the radius of curvature of the first and second pluralities of contours is approximately equal to the outer radius of curvature of the cells. The inner material layer of the dual layer thermal interface, and that which is adjacent to the coolant channel portion of the assembly, is comprised of a compressible material with a modulus of compressibility of less than 3 MPa, more preferably less than 1 MPa, and even more preferably less than 0.5 MPa. Preferably the compressible material comprising the inner layer has a thermal conductivity of greater than 0.4 $W \cdot m^{-1} K^{-1}$. An exemplary material for the inner material layer is silicone sponge with a preferred thickness in the range of 0.5 mm to 2 mm, and a more preferred thickness in the range of 1 mm to 1.5 mm. The outer material layer of the dual layer thermal interface, and that which is adjacent to the cells of the battery pack, is comprised of a dielectric material with a breakdown voltage of greater than 500 VDC, and more preferably greater than 1500 VDC. Preferably the dielectric material comprising the outer layer is tear resistant, flexible and deformable. Preferably the dielectric material comprising the outer layer has a tensile strength of greater than 5 MPa. Preferably the dielectric material comprising the outer layer and the cell's outer surface have a static coefficient of friction of less than 0.3. Exemplary materials for the outer material layer include low density polyethylene, polypropylene, silicone rubber and fluorinated ethylene propylene with a preferred thickness in the range of 0.05 mm to 0.2 mm, and a more preferred thickness in the range of 0.05 mm to 0.15 mm. The dual layer thermal interface may only be disposed on the surfaces of the coolant channel portion that are adjacent to the battery pack cells; alternately, the dual layer thermal interface layer may wrap around the lower region of the coolant channel portion of the assembly and cover the surfaces of the coolant channel portion that are adjacent to the battery pack cells; alternately, the dual layer thermal interface layer may wrap around the upper region of the coolant channel portion of the assembly and cover the surfaces of the coolant channel portion that are adjacent to the battery pack cells. The dual layer thermal interface may be bonded or tacked to the coolant channel portion of the assembly.

A further understanding of the nature and advantages of the present invention may be realized by reference to the remaining portions of the specification and the drawings.

BRIEF DESCRIPTION OF THE DRAWINGS

FIG. 3 is a cross-sectional view of the embodiment shown in FIG. 1;

FIG. 4 is a cross-sectional view of an embodiment similar to that shown in FIG. 3, utilizing a different coolant channel configuration;

FIG. 5 is a cross-sectional view of an embodiment similar to that shown in FIG. 3 with a different dual layer thermal interface configuration;

FIG. 6 is a cross-sectional view of an embodiment similar to that shown in FIG. 3 with a different dual layer thermal interface configuration;

DESCRIPTION OF THE SPECIFIC EMBODIMENTS

In the following text, the terms "battery", "cell", and "battery cell" may be used interchangeably and may refer to any of a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. Similarly, the terms "battery", "cell", and "battery cell" may refer to any of a variety of different form-factors including cylindrical (e.g., 18650 cells), pouch cells, rectangular cells, etc. The term "battery pack" as used herein refers to multiple individual batteries contained within a single piece or multi-piece housing, the individual batteries electrically interconnected to achieve the desired voltage and capacity for a particular application. It should be understood that identical element symbols used on multiple figures refer to the same component, or components of equal functionality. Additionally, the accompanying figures are only meant to illustrate, not limit, the scope of the invention and should not be considered to be to scale.

Figure 1:
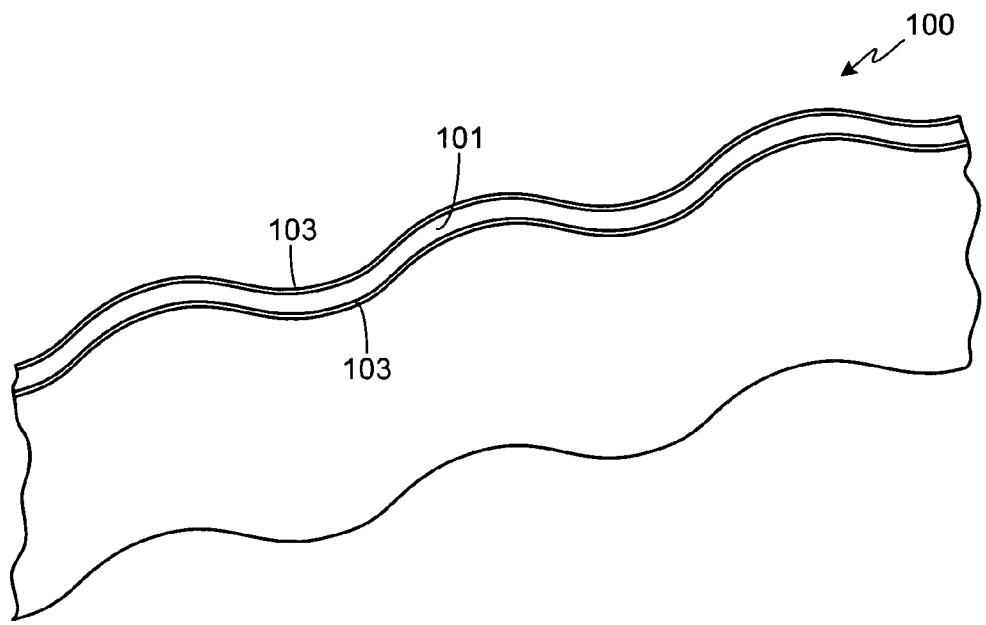
FIG. 1 is a perspective view of a portion of a cooling manifold assembly in accordance with the invention.

FIG. 1 is a perspective view of a portion of a cooling manifold assembly 100 in accordance with the invention. Manifold assembly 100 includes a central portion 101 interposed between a pair of dual layer thermal interface members 103. As described in further detail below, each dual layer thermal interface member 103 is comprised of a pair of material layers.

Figure 2:
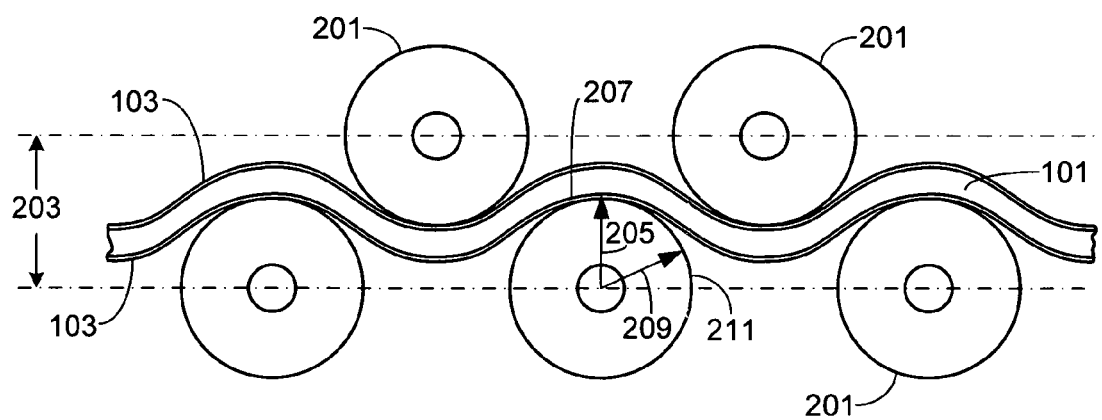
FIG. 2 is a top-down view of the cooling manifold assembly of FIG. 1 inserted between two rows of cells.

FIG. 2 is a top-down view of cooling manifold assembly 100 inserted between a plurality of cells 201. Preferably manifold assembly 100 has a wavy profile, also referred to as a scalloped profile, as shown. The illustrated wavy profile of assembly 100 serves several purposes. First, it allows a greater portion of each battery to be in thermal contact with the manifold assembly, thereby improving heat withdrawal efficiency. Second, it improves the packing density of a battery pack comprised of cells 201 by allowing the separation distance 203 between adjacent cell rows to be minimized. Note that in the preferred embodiment, the radius of curvature 205 of each contour of the exterior surface 207 of portion 101 of manifold assembly 100 is approximately equal to the radius of curvature 209 of the exterior battery casing 211.

FIG. 3 is a cross-sectional view of cooling manifold assembly 100. Within portion 101 are one or more coolant channels 301. Although four coolant channels 301 are shown in the illustrated embodiment, it should be understood that the invention is not limited to a cooling manifold with a specific number of coolant channels 301. Some of the considerations that are taken into account in determining the optimum number of coolant channels 301 within the assembly include; (i) the number of cells within the battery pack, (ii) the amount of thermal energy that the system is designed to handle, (iii) target battery pack weight, (iv) the intended application of the battery pack, (v) the form factor of the cells within the battery pack, and (vi) the cooling system to which the cooling manifold is coupled. Similar considerations are used in determining the optimal height 303 of manifold assembly 100. Preferably the height 303 is at least 20 percent of the overall height of the cell (e.g., cell 201) to which it is thermally coupled; more preferably height 303 is at least 30 percent of the overall height of the cell; still more preferably height 303 is at least 50 percent of the overall height of the cell; and yet still more preferably height 303 is at least 75 percent of the overall height of the cell. It will be appreciated that while the illustrated cooling manifold assembly has an approximately rectangular, elongated cross-section, other shapes can be used. For example, if the manifold includes a single coolant channel, the manifold may have a circular or a square cross-section. Similarly, any of a variety of shapes may be used for the coolant channels. For example, cooling channels 401 in assembly 400 are shaped in order to improve heat withdrawal efficiency (FIG. 4).

In those embodiments in which the cooling manifold assembly includes multiple coolant channels, e.g., assemblies 100 and 400, and in which the assembly is coupled to an active thermal management system, preferably the direction of coolant flow within adjacent cooling channels alternates. Accordingly, in assembly 100 the direction of coolant flow in channels 301A is opposite the direction in channels 301B. Alternating the coolant flow direction between channels allows heat transfer between opposing coolant channels, thereby providing a more uniform coolant temperature to the cells and improving overall thermal uniformity in the cells thermally coupled to the liquid cooling manifold assembly.

In a battery pack comprised of tens to thousands of cells, typically the individual cells are held in place with the desired battery-to-battery spacing using a pair of cell mounting brackets, e.g., an upper and a lower mounting bracket. While the cell mounting brackets may constitute the entire battery pack housing, they are often integrated within a larger battery pack housing that provides additional environmental protection for the cells and cell interconnects as well as an improved battery pack mounting structure. It will be appreciated that a conventional battery pack may use any of a variety of means to hold the cells in place. For example, each cell mounting bracket may include a plurality of wells that are suitably sized to receive a portion of each cell, the wells being formed during bracket fabrication via molding, milling or other well-known processes. Alternately, the cell mounting brackets may use a plurality of locator tabs to hold the cells in place.

Regardless of the design and configuration of the cell mounting brackets and battery pack housing, in a typical battery pack assembly process the cells are first located within a first mounting bracket. Once the cells are secured in place, a cooling manifold such as assembly 100 is positioned between the cells. The second mounting bracket is then placed in position, followed by cell wiring, potting, etc.

The coolant channel containing portion of the cooling manifold assembly is preferably fabricated from a high thermal conductivity material, thus ensuring that the thermal energy generated by the cells is efficiently transferred to the coolant within the coolant channels. Accordingly, in at least one preferred embodiment, the coolant channel containing portion (e.g., portion 101 in FIG. 1) is fabricated from a metal (e.g., aluminum, copper, etc.). Due to the construction of the dual layer thermal interface, as described below, the coolant channel containing portion of the assembly is preferably uncoated. It will be appreciated that in a conventional, prior art assembly in which the coolant channel containing portion is fabricated from metal, the metal is sprayed or otherwise coated with an electrically insulating material to prevent battery shorting, etc.

The inventor of the present invention has found that by using a dual layer thermal interface, production time and cost may be reduced, in part due to the elimination of the step of coating the coolant channel containing portion of the assembly with an electrically non-conductive coating. As illustrated in FIGS. 3 and 4, preferably the outer layer 305 of thermal interface 103 is comprised of an electrically non-conductive, high dielectric material. Preferably outer layer 305 has a breakdown voltage of at least 500 VDC; more preferably, at least 1,500 VDC; still more preferably, at least 3,000 VDC; and yet still more preferably, at least 10,000 VDC. In order to prevent dual layer thermal interface 103 from ripping, tearing, or otherwise losing or disrupting its dielectric or thermal properties during assembly, the material comprising layer 305 must also be tear resistant and have a high tensile strength (e.g., preferably greater than 5 MPa, and more preferably greater than 10 MPa). Assuming the use of a profiled assembly 100, as preferred and as illustrated, layer 305 must also be flexible and ductile (i.e., deformable) so that thermal interface 103 can follow the profile of the channel containing portion of the assembly without bunching, tearing, or forming pinholes. Preferably material layer 305 also has a relatively low surface friction, thus allowing a cooling manifold/thermal interface assembly (e.g., assembly 100) to be easily inserted between adjacent cell rows. For example, preferably the static coefficient of friction between layer 305 and the cell outer surface is less than 0.3. Exemplary materials for layer 305 of the dual layer thermal interface include low density polyethylene (LDPE), polypropylene (PP), silicone rubber and fluorinated ethylene propylene (FEP). The thickness of layer 305 is preferably in the range of 0.05 mm to 0.2 mm, more preferably in the range of 0.05 mm to 0.15 mm, and still more preferably in the range of 0.05 mm to 0.1 mm.

The inner material layer 307 of dual layer thermal interface 103 is comprised of a highly compressible material. The compressibility of layer 307 ensures that the thermal interface, and thus the cooling manifold, is in good thermal contact throughout the contact region between the cooling manifold assembly and each of the cells, even allowing for spacing variations due to mounting and manufacturing tolerances. Preferably the modulus of compressibility of layer 307 is less than 3 MPa, more preferably less than 1 MPa, and even more preferably less than 0.5 MPa. During insertion, layer 307 is preferably sized to have a fractional compression of approximately 25%. Preferably layer 307 is fabricated from an electrically non-conductive material. An exemplary material for layer 307 is a silicone sponge, preferably with a thickness in the range of 0.5 mm to 2 mm, and more preferably in the range of 1 mm to 1.5 mm.

Although the use of thermally conductive materials for layers 305 and 307 is preferred, given the thickness of thermal interface 103 and the proximity of cooling manifold portion 101 to the adjacent cells, the thermal conductivity of interface 103, and in particular layers 305 and 307 of interface 103, does not have to be exceedingly high. Due to the relative thicknesses of layers 305 and 307, it will be appreciated that the thermal conductivity of inner layer 307 is more important than that of outer layer 305. Preferably the thermal conductivity of each layer 305/307 is greater than 0.2 W-m$^{-1}$K$^{-1}$, more preferably greater than 0.4 W-m$^{-1}$K$^{-1}$, still more preferably greater than 1 W-m$^{-1}$K$^{-1}$, and yet still more preferably greater than 5 W-m$^{-1}$K$^{-1}$. Additives may be added to layer 305 and/or layer 307 to increase their conductivity. For example, in a preferred embodiment in which layer 307 is comprised of silicon sponge, a small percentage (e.g., preferably less than 10%) of a ceramic filler such as alumina or boronitride is added to the silicon sponge to increase its thermal conductivity to approximately 0.4 W-m$^{-1}$K$^{-1}$.

In one embodiment, illustrated in FIG. 5, the dual layer thermal interface 103 is only applied to the side surfaces of coolant channel containing portion 101. In this embodiment, the dual layer thermal interface 103 is preferably bonded to the side surfaces of portion 101. This approach is not a preferred embodiment, however, as it is difficult to prevent the thermal interface from de-bonding at junctions 501 during battery pack assembly. The de-bonding issue is overcome by using the approach illustrated in FIGS. 3 and 4. As shown, dual layer thermal interface 103 is wrapped around the lower region 309 of coolant channel portion 101. As a result, the cooling manifold assembly can be inserted between two rows of cells with minimal risk of the thermal interface de-bonding during the assembly process. It will be appreciated that if the cooling manifold assembly is mounted within the battery pack prior to mounting the batteries, i.e., the assembly steps are reversed, then the dual layer thermal interface 103 is wrapped around the upper region 601 of the coolant channel portion 101 as shown in FIG. 6. The configuration illustrated in FIG. 6 allows the cells to be downwardly inserted in direction 603 without de-bonding the thermal interface.

When using the dual layer thermal interface wrapping configuration illustrated in FIGS. 3, 4 and 6, it is not necessary to bond interface 103 to portion 101, since after assembly the compression of layer 103 prevents the assembly from becoming dislodged. However, depending upon the size of the cooling manifold assembly and the number of cells within the battery pack, the inventor has found that bonding or at least tacking the thermal interface to portion 101 expedites battery pack assembly. If a tacking approach is used, only a few small regions of the thermal interface 103 are bonded to portion 101, sufficient to hold interface 103 in place during assembly.

Although the cells in the illustrated embodiments have a cylindrical form, e.g., an 18650 form-factor, as previously noted the invention may be used with other cell designs, shapes, configurations and form-factors. Additionally, the invention is not limited to a battery pack with a specific number of cells, a specific cell interconnect arrangement, or a specific battery pack configuration.

Figure 7:
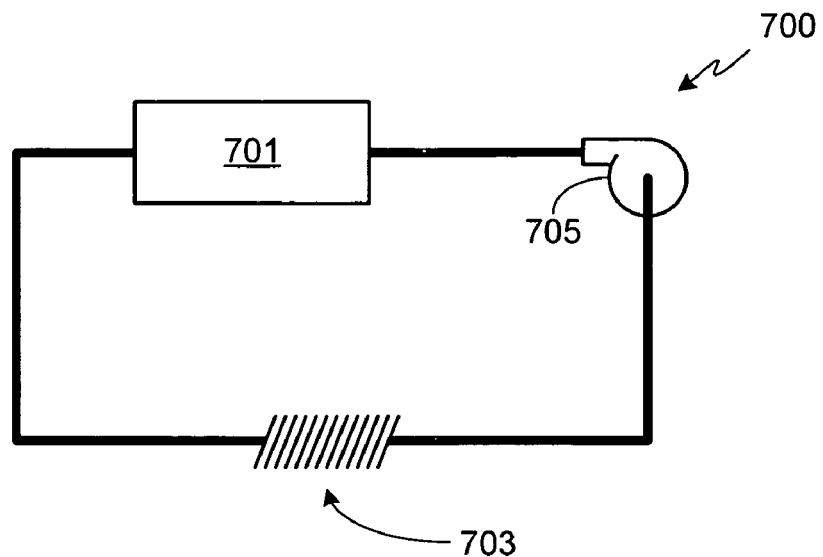
FIG. 7 illustrates the cooling manifold assembly of the invention coupled to a cooling system.
Figure 8:
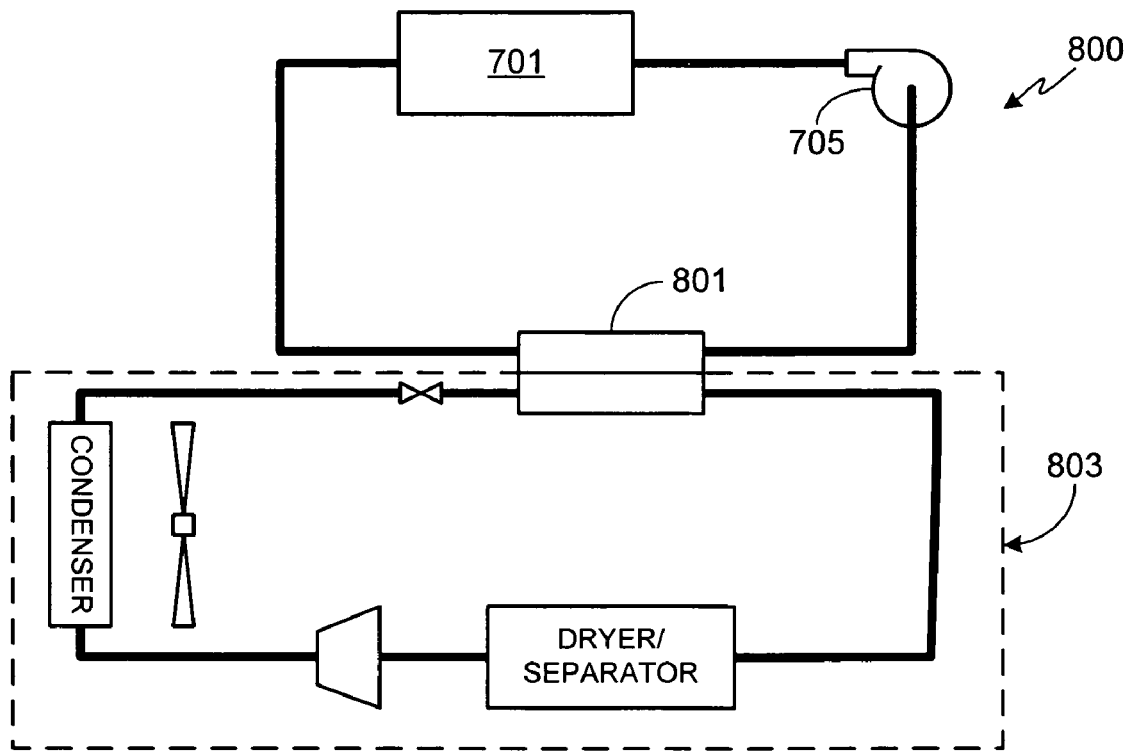
FIG. 8 illustrates the cooling manifold assembly of the invention coupled to an alternate cooling system.

It will be appreciated that a liquid cooling manifold assembly as described herein may be coupled to any of a variety of different cooling systems. FIGS. 7 and 8 illustrate two such cooling systems. In the embodiment illustrated in FIG. 7, the liquid cooling manifold assembly within battery pack 701 is coupled to a radiator 703. Cooling system 700 may be completely passive or utilize a coolant pump 705 as shown. In the embodiment illustrated in FIG. 8, the liquid cooling manifold assembly within battery pack 701 is coupled via a heat exchanger 801 to a thermal management system 803. Thermal management system 803 may utilize a refrigeration system or other means. An exemplary thermal management system that may be used with the present liquid cooling manifold assembly is disclosed in co-pending U.S. patent application Ser. No. 11/786,108, the disclosure of which is incorporated herein for any and all purposes.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A thermal management system for use with a battery pack, the battery pack comprised of a plurality of substantially cylindrical cells arranged into at least a first row of cells and a second row of cells, wherein said first row of cells is adjacent to said second row of cells, and wherein said first row of cells is offset from said second row of cells, said system comprising:
    a liquid cooling manifold assembly interposed between said first and second rows of cells, said liquid cooling manifold comprising:
        a coolant channel portion, said coolant channel portion including at least one coolant channel, wherein said coolant channel portion is comprised of a first surface adjacent to said first row of cells and a second surface adjacent to said second row of cells, and wherein said coolant channel portion is comprised of a first plurality of contours coinciding with said cells of said first row of cells and a second plurality of contours coinciding with said cells of said second row of cells, and wherein said first and second pluralities of contours alternate;
        a first dual layer thermal interface interposed between said first surface and said first row of cells, wherein said first dual layer thermal interface is comprised of an inner material layer adjacent to said first surface and an outer material layer adjacent to said first row of cells;
        a second dual layer thermal interface interposed between said second surface and said second row of cells, wherein said second dual layer thermal interface is comprised of said inner material layer adjacent to said second surface and said outer material layer adjacent to said second row of cells; and
        wherein said inner material layer is fabricated from a compressible material with a modulus of compressibility of less than 3 MPa and said outer material layer is fabricated from a dielectric material with a breakdown voltage of greater than 500 VDC, and wherein said inner and outer material layers are comprised of different materials.

2. The thermal management system of claim 1, wherein a single dual layer thermal interface is comprised of said first dual layer thermal interface and said second dual layer thermal interface, wherein said single dual layer thermal interface wraps around an upper region of said coolant channel portion.

3. The thermal management system of claim 2, wherein said single dual layer thermal interface is bonded to said first and second surfaces in a plurality of locations.

4. The thermal management system of claim 1, wherein a single dual layer thermal interface is comprised of said first dual layer thermal interface and said second dual layer thermal interface, wherein said single dual layer thermal interface wraps around a lower region of said coolant channel portion.

5. The thermal management system of claim 4, wherein said single dual layer thermal interface is bonded to said first and second surfaces in a plurality of locations.

6. The thermal management system of claim 1, wherein a radius of curvature corresponding to each of said first and second pluralities of contours is approximately equal to an outer radius of curvature of said cells.

7. The thermal management system of claim 1, wherein said modulus of compressibility of said compressible material comprising said inner material layer is less than 1 MPa and wherein said breakdown voltage of said dielectric material comprising said outer material layer is greater than 1500 VDC.

8. The thermal management system of claim 1, wherein said dielectric material comprising said outer material layer is tear resistant, flexible and deformable.

9. The thermal management system of claim 1, wherein said dielectric material comprising said outer material layer has a tensile strength greater than 5 MPa.

10. The thermal management system of claim 1, wherein a static coefficient of friction between said dielectric material comprising said outer material layer and a cell surface is less than 0.3.

11. The thermal management system of claim 1, wherein said dielectric material comprising said outer material layer is fabricated from a material selected from the group consisting of low density polyethylene, polypropylene, silicone rubber and fluorinated ethylene propylene.

12. The thermal management system of claim 1, wherein said compressible material comprising said inner material layer is fabricated from a silicone sponge material.

13. The thermal management system of claim 1, wherein said compressible material comprising said inner material layer has a thermal conductivity of greater than 0.4 $W \cdot m^{-1} K^{-1}$.

14. The thermal management system of claim 1, wherein said dielectric material comprising said outer material layer has a thickness in the range of 0.05 mm to 0.2 mm.

15. The thermal management system of claim 1, wherein said dielectric material comprising said outer material layer has a thickness in the range of 0.05 mm to 0.15 mm.

16. The thermal management system of claim 1, wherein said compressible material comprising said inner material layer has a thickness in the range of 0.5 mm to 2 mm.

17. The thermal management system of claim 1, wherein said compressible material comprising said inner material layer has a thickness in the range of 1 mm to 1.5 mm.

18. The thermal management system of claim 1, wherein said coolant channel portion is fabricated from a metal.

19. The thermal management system of claim 1, wherein said coolant channel portion is fabricated from aluminum.

20. The thermal management system of claim 1, wherein said coolant channel portion includes at least a first coolant channel and a second coolant channel, wherein coolant flows in said first coolant channel in a first direction and coolant flows in said second coolant channel in a second direction, wherein said first direction is opposite to said second direction.

* * * * *